United States Patent [19]

Yamato et al.

[11] Patent Number: 5,434,227
[45] Date of Patent: Jul. 18, 1995

[54] PROCESS FOR PRODUCING POLYCARBONATE

[75] Inventors: Tsutomu Yamato; Yasuhiro Oshino; Yutaka Fukuda; Tatsuya Kanno; Takaaki Kuwana; Yoshimichi Okano, all of Hyogo, Japan

[73] Assignee: Daicel Chemical Industries, Ltd., Osaka, Japan

[21] Appl. No.: 851,806

[22] Filed: Mar. 16, 1992

[30] Foreign Application Priority Data

| May 8, 1991 | [JP] | Japan | 3-198964 |
|---|---|---|---|
| Nov. 6, 1991 | [JP] | Japan | 3-290176 |
| Nov. 6, 1991 | [JP] | Japan | 3-290177 |
| Nov. 6, 1991 | [JP] | Japan | 3-290178 |
| Nov. 8, 1991 | [JP] | Japan | 3-293037 |
| Nov. 8, 1991 | [JP] | Japan | 3-293038 |
| Nov. 8, 1991 | [JP] | Japan | 3-293039 |
| Nov. 19, 1991 | [JP] | Japan | 3-303584 |
| Nov. 21, 1991 | [JP] | Japan | 3-334083 |
| Nov. 21, 1991 | [JP] | Japan | 3-334084 |
| Nov. 28, 1991 | [JP] | Japan | 3-314736 |

[51] Int. Cl.$^6$ .................. C08F 2/00; C08G 64/00
[52] U.S. Cl. .................. 526/62; 525/468; 528/196; 528/198; 528/200
[58] Field of Search .......... 528/200, 196, 198; 525/468; 526/62

[56] References Cited

U.S. PATENT DOCUMENTS 4,267,303  5/1981  König et al. .................. 528/200
4,383,092  5/1983  Ko et al. .................. 526/62

FOREIGN PATENT DOCUMENTS 0338085 10/1989 European Pat. Off. .
0351168  1/1990 European Pat. Off. .
0360578  3/1990 European Pat. Off. .
0382250  8/1990 European Pat. Off. .

OTHER PUBLICATIONS

Chemical Abstracts, vol. 116, No. 20, May 18, 1992, Yamoto et al, 195134r, Manufacture of Polycarbonates with High Molecular Weight and Low Coloration.

*Primary Examiner*—James J. Seidleck
*Assistant Examiner*—T. Mosley
*Attorney, Agent, or Firm*—Flynn, Thiel, Boutell & Tanis

[57] ABSTRACT

A polycarbonate is produced by transesterification from a dihydroxy compound such as 2,2-bis(4-hydroxyphenyl)propane and a diester of carbonic acid such as bisphenyl carbonate in the presence of a substance containing iron in an amount of 50% by weight or less to contact the reactants. Also, a polycarbonate is produced by transesterification from a dihydroxy compound and a diester of carbonic acid in a reactor made of stainless steel and treated by electropolishing or acid pickling or buffed on a surface part thereof to contact the reactants. As the transesterification catalyst, (a) a nitrogen-containing, electron-donating compound and (b) a nitrogen-containing, electron-donating compound and an alkali metal compound or an alkaline earth metal compound are preferably used.

12 Claims, No Drawings

PROCESS FOR PRODUCING POLYCARBONATE

FIELD OF THE INVENTION

The present invention relates to a process for producing a polycarbonate by transesterification, particularly a process for producing a polycarbonate in which a polycarbonate which having little coloring and an enhanced molecular weight can be obtained.

DESCRIPTION OF THE RELATED ART

Polycarbonate is a general-purpose engineering thermoplastic having excellent mechanical properties, optical properties and heat resistance, and is used in extensive fields such as an injection molding resin, sheet substitutive for window glass, etc.

Polycarbonate has hitherto been produced by interfacial polycondensation or transesterification.

Interfacial polycondensation has widely been utilized in the general production of polycarbonates. However, it is disadvantageous in that toxic phosgene must be used and the polymer produced by this method is colored when it is molded at high temperatures due to the residual chlorine ion present in the formed polycarbonate. In order to solve these problems, Japanese Patent Laid-Open No. 182336/1988 disclosed a process for producing a polycarbonate by using trichloromethyl chloroformate, which is liquid and a dimer of phosgene instead of toxic phosgene. However, dihydric phenols referred to therein as a starting material are limited to 9,9-bis(4-hydroxyphenyl)fluorenes, which are special compounds as a dihydric phenol, so that the process disclosed therein cannot be thought to be a general-purpose process. On the other hand, in Angew. Chem. Vol. 99, Page 922 (1987) and German Patent DE 3440141, a process for producing a polycarbonate from 2,2-bis(4-hydroxyphenyl)propane by using triphosgene instead of toxic phosgene. In this process, however, phosgene is generated in the course of reaction.

As an example of the methods using transesterification, U.S. Pat. No. 4,345,062 discloses a process which comprises synthesizing a prepolymer from diphenyl carbonate and an aromatic dihydroxy compound by heating under reduced pressure in the presence of a transesterification catalyst while distilling out formed phenol, and finally heating the obtained prepolymer to 270° C. or above in a high vacuum while distilling out formed phenol to obtain a high molecular weight polycarbonate. This process is advantageous in that it uses no toxic phosgene, the removal of the residual chlorine ion is unnecessary, and the reaction can be carried out in a mode of melt-polycondensation. On the other hand, this process has been known to be disadvantageous in that it generally requires a high reaction temperature of, for example, 270° C. or above because the polycarbonate increases its melt viscosity to a great extent as its molecular weight increases, unlike other engineering plastics, and that it necessitates a vacuum as high as $10^{-2}$ Torr for distilling out formed phenol having a high boiling point. For these requirements in this process, the industrialization thereof is difficult from the standpoint of equipment. Further, the hue and physical properties of the obtained polycarbonate are adversely affected by the phenol remaining therein and to the high reaction temperature. Moreover, the transesterification method has not yet given a polycarbonate of high molecular weight.

In spite of the above disadvantages, many studies have been made on the transesterification method, because the method is an industrially economical process which can give a polycarbonate by melt-polycondensation. Particularly, it has been suggested that the material of the reaction vessel used exerts an influence on the coloration of the product. Namely, in Japanese Patent Laid-Open No. 142025/1980, it is suggested that, when stainless steel is used as the material constructing the reactor in the preparation of polycarbonate by the transesterification method, the formed polycarbonate is apt to be colored and a polymer having a high molecular weight is difficult to obtain, so that the production of a polymer having both excellent properties and color cannot be achieved. Further, the inventors of the present invention found that when a carbon steel or a stainless steel was used as the material of the reactor in the preparation of polycarbonate by the transesterification method using a transesterification catalyst, the molecular weight of the polycarbonate could not be enhanced enough with the reproducibility thereof being poor and the obtained polycarbonate significantly colored.

To overcome these problems, it has been proposed in U.S. Pat. No. 4383092 that the coloration of the product is inhibited by using tantalum, nickel or chromium as the material of the reactor. However, a reactor made of only these metals is too expensive to be practical in this respect. In Japanese Patent Laid-Open No. 72327/1992, published on Mar. 6, 1992, the use of a reactor made of a material comprising Cu and/or Ni in an amount of 854 by weight or above is proposed. Further, in Japanese Patent Laid-Open No. 24934/1990, the use of a reactor made of glass and a stirrer made of nickel is mentioned and in Japanese Patent Laid-Open No. 153923/1990, the use of glass, nickel, tantalum, chromium or polyfluoroethylene as the material of the reactor is mentioned.

With the aim of overcoming the above-mentioned faults of the transesterification method, a variety of catalysts have also been studied (Japanese Patent Laid-Open No. 142025/1980, for example). However, none of these catalysts can simultaneously fulfil the requirements concerning the properties and color of the polycarbonate.

SUMMARY OF THE INVENTION

Accordingly, the object of the present invention is to provide an industrial process for producing a polycarbonate having a high molecular weight and free from coloration with a high efficiency.

The inventors of the present invention have made intensive studies on the molecular weight of the polycarbonate and the coloration thereof in which the polycarbonate prepared by the transesterification method of the prior art were problematic. As a result, they have found that a polycarbonate having an enhanced molecular weight and excellent in transparency can be obtained by reacting the reactants, that is starting materials, in the presence of a specified substance or by reacting the reactants in a treated stainless steel reactor. The present invention has been accomplished on the basis of these findings.

Namely, the present invention provides a process for producing a polycarbonate by transesterification, which comprises reacting a dihydroxyl compound with a diester of carbonic acid in the presence of a substance containing iron in an amount of 50% by weight or less to contact the reactants.

The above-described present invention includes the following embodiments (1) to (34).

(1) A reactor for the reaction which has a surface area made of the above-described substance which the reactants are brought into contact with is used in the process.

(2) An additive, at least the surface thereof is made of the above-described substance, is present in the reaction system to contact the reactants.

(3) An additive which is made of the above-described substance and is in the form of powder is present in the reaction system to contact the reactants.

(4) The substance is a silicate.

(5) A reactor for the reaction, at least part thereof is made of glass to contact the reactants, is used in the process.

(6). A reactor for the reaction, at least part thereof is lined with glass to contact the reactants, is used in the process.

(7) The substance is ceramics.

(8) A reactor for the reaction, at least part thereof is made of ceramics to contact the reactants, is used in the process.

(9) A reactor for the reaction, at least part thereof is treated with ceramic coating to contact the reactants, is used in the process.

(10) The substance is polyfluoroethylene.

(11) A reactor for the reaction, at least part thereof is made of polyfluoroethylene to contact the reactants, is used in the process.

(12) A reactor for the reaction, at least part thereof is coated with polyfluoroethylene to contact the reactants, is used in the process.

(13) The substance is selected from the group consisting of metals other than iron, carbon and metal alloys containing iron in an amount of 50% by weight or less.

(14) A reactor for the reaction, at least part thereof is made of a material selected from the group consisting of metals other than iron, carbon and metal alloys containing iron in an amount of 50% by weight or less to contact the reactants, is used in the process.

(15) A reactor for the reaction, at least part thereof is plated with a material selected from the group consisting of metals other than iron and metal alloys containing iron in an amount of 50% by weight or less to contact the reactants, is used in the process.

(16) An additive, which is made of a material selected from the group consisting of metals other than iron, carbon and metal alloys containing iron in an amount of 50% by weight or less, is present in the reaction system to contact the reactants.

(17) An additive, which is plated with a material selected from the group consisting of metals other than iron and metal alloys containing iron in an amount of 50% by weight or less, is present in the reaction system to contact the reactants.

(18) The substance is a metal alloy containing iron in an amount of from 20% to 50% by weight.

(19) The substance is a metal alloy which contains iron in an amount of from 20% to 50% by weight and further contains Cr and/or Co in an amount of 50% by weight or above or Al and/or Mn in an amount of 50% by weight or above. (20) The substance is a metal alloy containing iron in an amount of from 20% to 40% by weight. (21) The substance is a metal alloy which contains iron in an amount of from 20% to 40% by weight and further contains Ni and/or Cr in an amount of 60% by weight or above, Ni and/or C in an amount of 60% by weight or above, Ni and/or Mo in an amount of 60% by weight or above, Ni and/or Al in an amount of 60% by weight or above, Ni and/or Cu in an amount of 60% by weight or above, Cu and/or Al in an amount of 60% by weight or above or Cu and/or Zn in an amount of 60% by weight or above. (22) The substance is Ni, Cr, Mo, Al, Cu Zn, Co Mn or C, (23) The substance is a metal alloy containing iron in an amount of 20% by weight or less. (24) The substance is a metal alloy which contains iron in an amount of 20% by weight or less and further contains Ni and/or Cr in an amount of 60% by weight or above, Ni and/or C in an amount of 60% by weight or above, Ni and/or Mo in an amount of 60% by weight or above, Ni and/or Al in an amount of 60% by weight or above, Ni and/or Cu in an amount of 60% by weight or above, Cu and/or Al in an amount of 60% by weight or above, Cu and/or Zn in an amount of 60% by weight or above, Cr and/or Co in an amount of 50% by weight or above or Al and/or Mn in an amount of 50% by weight or above.

(25) The substance contains at least one element selected from the group consisting of Ta, Ni, Cr and Cu.

(26) A reactor for the reaction, at least part thereof is made of a substance containing at least one element selected from the group consisting of Ta, Ni, Cr and Cu to contact the reactants, is used in the process.

(27) A reactor for the reaction, at least part thereof is coated with a substance containing at least one element selected from the group consisting of Ta, Ni, Cr and Cu to contact the reactants, is used in the process,

(28) The substance is a metal alloy comprising Cu and/or Ni in an amount of from 60% to less than 85% by weight and Fe in an amount of 40% by weight or less.

(29) A reactor for the reaction, at least part thereof is made of a metal alloy comprising Cu and/or Ni in an amount of from 60% to less than 85% by weight and Fe in an amount of 40% by weight or less to contact the reactants, is used in the process.

(30) A reactor for the reaction, at least part thereof is coated with a metal alloy comprising Cu and/or Ni in an amount of from 60% to less than 85% by weight and Fe in an amount of 40% by weight or less to contact the reactants, is used in the process.

(31) The substance is a metal alloy comprising Cu and Zn in an amount of from 60% to 99.5% by weight and Fe in an amount of 40% by weight or less.

(32) A reactor for the reaction, at least part thereof is made of a metal alloy comprising Cu and Zn in an amount of from 60% to 99.5% by weight and Fe in an amount of 40% by weight or less to contact the reactants, is used in the process.

(33) A reactor for the reaction, at least part thereof is coated with a metal alloy comprising Cu and Zn in an amount of from 60% to 99.5% by weight and Fe in an amount of 40% by weight or less to contact the reactants, is used in the process.

(34) The transesterification is carried out in the presence of (a) a nitrogen-containing, electron-donating compound or (b) a nitrogen-containing, electron-donating compound and an alkali metal compound or an alkaline earth metal compound.

The present invention also provides a process for producing a polycarbonate by transesterification, which comprises reacting a dihydroxyl compound with a diester of carbonic acid in a reactor made of stainless steel and treated by electropolishing on a surface part thereof to contact the reactants.

The present invention further provides a process for producing a polycarbonate by transesterification, which comprises reacting a dihydroxyl compound with a diester of carbonic acid in a reactor made of stainless steel and treated by acid pickling on a surface part thereof to contact the reactants.

The present invention provides a process for producing a polycarbonate by transesterification, which comprises reacting a dihydroxyl compound with a diester of carbonic acid in a reactor made of stainless steel and buffed on a surface part thereof to contact the reactants.

In these processes, the transesterification is carried out in the presence of (a) a nitrogen-containing, electron-donating compound or (b) a nitrogen-containing, electron-donating compound and an alkali metal compound or an alkaline earth metal compound is preferable.

DETAILED DESCRIPTION OF THE INVENTION

In the present invention, a variety of compounds can be used as the dihydroxy compound. For example, bis(hydroxyaryl)alkanes, bis(hydroxyaryl)arenes, bis(hydroxyaryl)cycloalkanes, dihydroxydiaryl ethers, dihydroxydiaryl sulfides, dihydroxydiaryl sulfoxides, dihydroxydiaryl sulfones, etc., can be used.

Among these compounds, preferable dihydroxy compounds are those represented by the following general formulas (I), (II), (III), (IV), (V), (VI) and (VII):

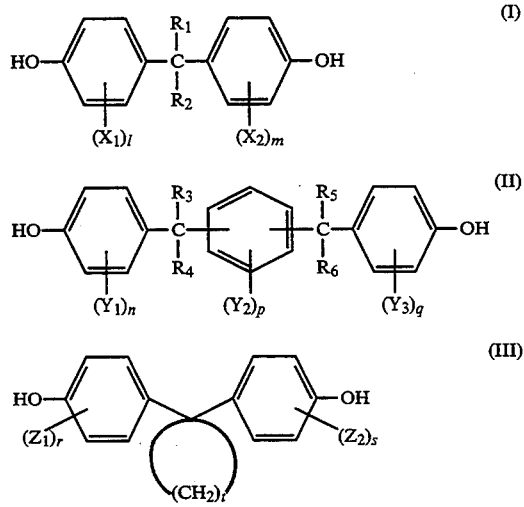

wherein $R_1$, $R_2$, $R_3$, $R_4$, $R_5$ and $R_6$, which may be the same or different, each represent a hydrogen atom, an alkyl group, a cycloalkyl group, an aralkyl group or an aryl group; $X_1$, $X_2$, $Y_1$, $Y_2$, $Y_3$, $Z_1$ and $Z_2$, which may be the same or different, each represent a halogen atom, an alkoxy group, an alkyl group, a cycloalkyl group, an aralkyl group or an aryl group; l, m, n, p, q, r and s each represent an integer of 0-4; and t represents an integer of 2-10.

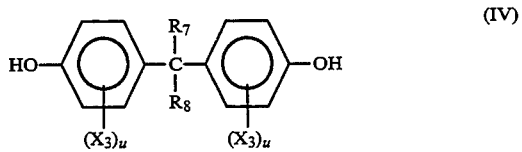

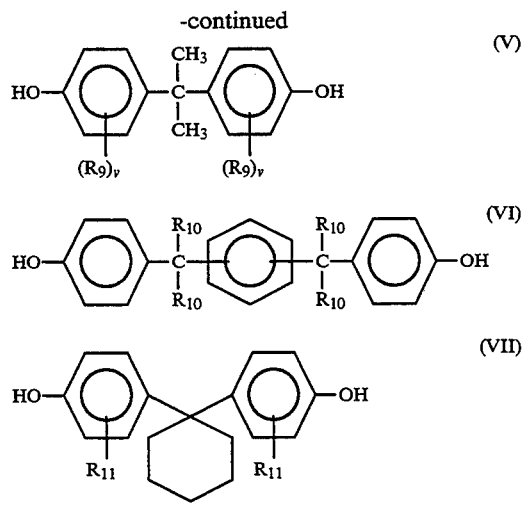

wherein $R_7$, $R_8$, $R_9$, $R_{10}$ and $R_{11}$ each represent a hydrogen atom, a straight-chain or branched alkyl group having 1 to 8 carbon atoms or a phenyl group; $X_3$ represents a halogen atom; u is 0 to 4; and v is 1 to 4.

Examples of the alkyl group include straight-chain or branched alkyl groups such as methyl group, ethyl group, n-propyl group, isopropyl group, n-butyl group, isobutyl group, t-butyl group, n-pentyl group, isopentyl group, neopentyl group, hexyl group, heptyl group, octyl group, 2-ethylhexyl group, decyl group, undecyl group, dodecyl group and the like, among which preferable alkyl groups are straight-chain or branched alkyl groups having about 1 to 8 carbon atoms.

Examples of the cycloalkyl group include cyclopropyl group, cyclopentyl group, cyclohexyl group, cycloheptyl group, cyclooctyl group and the like.

Examples of the aralkyl group include benzyl group, phenethyl group, benzhydryl group and the like. Examples of the aryl group include phenyl group, naphthyl group, anthryl group and the like, among which a preferable aryl group is phenyl group.

The halogen atom includes fluorine atom, chlorine atom, bromine atom and iodine atom. The alkoxy group includes: methoxy group, ethoxy group, n-propoxy group, isopropoxy group, n-butoxy group, isobutoxy group, pentyloxy group, hexyloxy group and the like.

The alkyl group, the cycloalkyl group, the aryl group and the aralkyl group may have one or more substituents which are inert under the conditions of the transesterification reaction. Examples of such a substituent include a halogen atom, an alkoxy group, an aryloxy group, an aralkyloxy group, an alkylthio group, a cyano group, a nitro group and the like.

As the substituents $R_1$ to $R_6$, a hydrogen atom, an alkyl group (particularly those having 1 to 8 carbon atoms) and an aryl group (particularly a phenyl group) are preferred. As the substituents $X_1$, $X_2$, $Y_1$, $Y_2$, $Y_3$, $Z_1$ and $A_2$, an alkyl group (particularly those having 1 to 8 carbon atoms), an aryl group (particularly a phenyl group) and a halogen atom are preferred.

Preferable examples of the dihydroxy compound include 2,2-bis(4-hydroxyphenyl)propane, 2,2-bis(4-hydroxyphenyl)butane, 2,2-bis(4-hydroxyphenyl)-4-methylpentane, 2,2-bis(4-hydroxyphenyl)octane, 4,4'-dihydroxy-2,2,2-triphenylethane, 2,2-bis(3,5-dibromo-4-hydroxyphenyl)propane, 2,2-bis(4-hydroxy-3-methylphenyl)propane, 2,2-bis(4-hydroxy-3-isopropylphenyl)- propane, 2,2-bis(4-hydroxy-3-sec-butylphenyl)propane, 2,2-bis(3,5-dimethyl-4-hydroxyphenyl)propane, 2,2-bis(4-hydroxy-3-tert-butylphenyl)propane, 1,1'-bis(4-hydroxyphenyl)-p-diisopropylbenzene, 1,1'-bis(4-hydroxyphenyl)-m-diisopropylbenzene, 1,1-bis(4-hydroxyphenyl)cyclohexane and the like. These dihydroxy compounds can be used either alone or in combination of two or more members among them for the production of a copolycarbonate.

Examples of the diester of carbonic acid include bisaryl carbonates such as diphenyl carbonate, bis(2,4.-dichlorophenyl) carbonate, bis(2,4,6trichlorophenyl) carbonate, bis(2-cyanophenyl) carbonate, bis(o-nitrophenyl) carbonate, ditolyl carbonate, m-cresyl carbonate, dinaphthyl carbonate, bis(diphenyl) carbonate and the like; dicycloalkyl carbonates such as dicyclohexyl carbonate and the like; and dialkyl carbonates such as dimethyl carbonate, diethyl carbonate and the like. Among these, bisaryl carbonates are preferable, and diphenyl carbonate is particularly preferred.

The diester of carbonic acid is used in an amount equimolar to that of the dihydroxyl compound present in the reaction system. Generally, 1 mol of a carbonate compound must be reacted with 1 mol of a dihydroxyl compound in order to form a high-molecular weight polycarbonate. When a bisaryl carbonate is used as the diester of carbonic acid, two molecules of a monohydroxyl compound are liberated by the above-mentioned reaction. According to the present invention, this monohydroxyl compound is distilled out of the reaction system. However, in the industrial process of the prior art, an excess of a diester of carbonic acid is reacted with a dihydroxyl compound. Therefore, the amount of the diester of carbonic acid which is used as a starting material is usually 0.90 to 1.50 mol, preferably 0.95 to 1.25 mol, and still preferably about 1.00 to 10 mol, per mole of the dihydroxy compound as other starting material.

A process for producing a polycarbonate by transesterification, which comprises reacting a dihydroxyl compound with a diester of carbonic acid in the presence of a substance containing iron in an amount of 50% by weight or less to contact the reactants will be described in detail.

The substance according to the present invention is one which contains iron in an amount of 50% by weight or less. The substance may be broadly classified into four groups, i.e., inorganic material, organic material, metal and metal alloy. The metal alloy may be further classified into three groups, i.e., one containing iron in an amount of from 20% to 50% by weight, one containing iron in an amount of from 20% to 40% by weight and one containing iron in an amount of 20% by weight or less.

Examples of the inorganic material include silicates such as SiO$_2$ glass and opaque mullite; oxides such as beryllium oxide, magnesium oxide, spinel and aluminum oxide; carbides such as silicon carbide, boron carbide and tungsten carbide; nitrides such as silicon nitride and boron nitride; borides such as titanium boride; silicides such as molybdenum silicide and carbons such as graphite. Examples of the inorganic material also include ceramics which exhibit excellent thermal resistance, and examples of the ceramics include oxide ceramics such as aluminium oxide, magnesium oxide, spinel, beryllium oxide, partially stabilized zirconia, zirconia, high-toughness alumina, cordierite, aluminium titanate, mullite, titanium oxide, tin oxide, thorium dioxide and chromium oxide; nitride ceramics such as silicon nitride, boron nitride, aluminium nitride, titanium nitride zirconium nitride, hafnium nitride and sialon; carbide ceramics such as silicon carbide, boron carbide and tungsten carbide; silicate ceramics such as stone ware, porcelain, high-refractory porcelain and crystallized glass; carbon material such as amorphous carbon and hexagonal system graphite; boride ceramics such as titanium boride; and silicides such as molybdenum silicide.

Examples of the organic material include polyfluoroethylene. The term "polyfluoroethylene" used herein means not only polyfluoroethylene alone but also polyfluoroethylene composition, i.e., a composition comprising polyfluoroethylene and other component(s).

Examples of the metal include those to which no second component is added intentionally, such as Ni, Cr, Mo, Al, Cu, Zn, Co and Mn. Preferably examples of the metal include Cu, Ni, Cr and Al.

The metal alloy according to the present invention includes those which contain iron in an amount of 50% by weight or less and further contain Cr and/or Co in an amount of 50% by weight or above or Al and/or Mn in an amount of 50% by weight or above. Namely, the metal alloy according to the present invention includes, for example, one which contains iron in an amount of 50% by weight or less, and Cr in an amount of 50% by weight or above; one which contains iron in an amount of 50% by weight or less, and Co in an amount of 50% by weight or above; and one which contains iron in an amount of 50% by weight or less, and Cu and Cr in a total amount thereof of 50% by weight or above.

The metal alloy according to the present invention includes those which contain iron in an amount of 40% by weight or less and further contain Ni and/or Cr in an amount of 60% by weight or above, Ni and/or C in an amount of 60% by weight or above, Ni and/or Mo in an amount of 60% by weight or above, Ni and/or Al in an amount of 60% by weight or above, Ni and/or Cu in an amount of 60% by weight or above, Cu and/or Al in an amount of 60% by weight or above or Cu and/or Zn in an amount of 60% by weight or above.

According to the present invention, a colorless transparent polycarbonate having a high molecular weight is obtained when the substance is a metal alloy containing iron in an amount of 50% by weight or less and further containing Cr and/or Co in an amount of 50% by weight or above or Al and/or Mn in an amount of 50% by weight or above. The content of the total of Cr and Co, or, Al and Mn in a metal alloy is preferably 60% by weight or above, still preferably 70% by weight or above. As the examples of other metallic and nonmetallic components which the alloys can contain, W, Mo, Ti, Zr, Mn, Al Cu, Fe, Ni, Sn, Zn, Mg, Si, C, P, S and the like can be mentioned.

According to the present invention, a colorless transparent polycarbonate having a high molecular weight is obtained when the substance is a metal alloy containing iron in an amount of 40% by weight or less and further containing Ni and/or Cr in an amount of 60% by weight or above, Ni and/or C in an amount of 60% by weight or above, Ni and/or Mo in an amount of 60% by weight or above, Ni and/or Al in an amount of 60% by weight or above, Ni and/or Cu in an amount of 60% by weight or above, Cu and/or Al in an amount of 60% by weight or above or Cu and/or Zn in an amount of 60% by weight or above. A colorless transparent polycarbonate having a high molecular weight is also obtained when the metal alloy, which contains iron in an amount of 40% by weight or less, Ni and/or Cr in an amount of 60% by weight or above and Mo, is selected as the substance. In these alloys, Fe, Pb, Zn, Ti, V and the like may be incorporated as other components. If the content of above-described elements is lower than 60% by weight, the formation of high molecular weight product is obstructed, or the coloration of resin is accelerated.

Cases where these "other components" are present in a minute quantity are also included in the scope of the present invention. Further, said "other components" are not limited to the above-mentioned ones.

In the present invention, the substance is preferably one selected from the group consisting of metals other than iron and metal alloys containing iron in an amount of 20% by weight or less.

The metal alloy containing iron in an amount of 20% by weight or less includes Ni base alloys such as Nickel 200, Nickel 201, Duranickel 301, Monel 400, Nimonic 80A, Inconel 600, Inconel 601, Inconel X-750, Incoloy 800, Inconel 625, Inconel 657, Inconel 671, Hastelloy B-2, Hastelloy C-4, Hastelloy C-276, Hastelloy G-3, Hastelloy X, Nimonic 75, Nimonic 80, Nimonic 80A, Nimonic 90, M-252, Hastelloy C, Hastelloy R-252, Hastelloy W, Hastelloy X, Inconel, Inconel X, Inconel X500, Inconel 700, Waspaloy, Udimet 500, Udimet 700, Unitemp 1753 and Rene 41; Co—Cr—Ni base alloys such as S-816, V-36, L-605, HS-25 and WF-11; Ni base casting alloys such as Hastelloy B, Hastelloy C, Hastelloy X, Inconel 713C, Udimet 500, Thetaloy and GMR-235: Co base casting alloys such as HS-21, HS-31 and HA-36; and Cu base alloys such as phosphorus deoxidized copper, beryllium copper, Admiralty brass, Naval copper, aluminum bronze and Cupronickel. Meanwhile, the metal alloy containing iron in an amount of from 20% to 50% by weight includes Ni base alloys such as Incoloy 825 and Co—Cr—Ni base alloys such as S-590, N-155 and HS-95. However, the substance is not restricted to them.

In the present invention, as described above, it is preferred that the iron component accounts for 20% or less and a further reduced content thereof is still preferred. However, from the viewpoint of industrial profitability, a metal alloy containing the iron component within the range of the present invention is useful as a low-cost material. When the iron component accounts for more than 20% by weight it may bring about the result that the coloring of the resin obtained by the interaction of the iron component with a catalyst or a raw material cannot be neglected. Also, in view of the reaction activity of the catalyst, it may have an unfavorable tendency when the iron component accounts for more than 20% by weight.

As the method for contacting the reactants with the substance, (1) a method of reacting the reactants in a reactor made of the substance, at least in the positions coming into contact with the reactants, (2) a method of reacting the reactants in the presence of an additive of which at least surface is made of the substance, etc., can be mentioned.

The reactor to be used in method (1) is not particularly critical, so far as it is made of the above-described substance, at least in the positions coming into contact with the reactants. Not only a case where the whole of the reactor is made of the substance but also cases where a part of the reactor such as liquid-contacting part, agitating wing, baffle, etc., of the reactor is made of the substance are also included in the scope of the present invention. A reactor which has a surface layer such as coating film, plating film, flame spray coating film, lining layer, laminating layer and the like, of the above-described substance on the inner wall is also used. That is, a reactor for the transesterification reaction which has a surface area made of the substance which the reactants are brought into contact with can be used in method (1).

The above-described surface layer is made, for example, by lining with glass, coating with ceramics, coating with polymer, e.g., polyfluoroethylene, plating with metal or plating with metal alloy on a reactor made of, e.g., stainless steel, carbon steel or the like.

The term "plating" used herein inclusively means electroplating, chemical plating and vacuum metallizing generally, among which, industrially preferable ones are electroplating (electrolytic plating) and chemical plating (electroless plating). As the plating metal, the metals and metal alloys described above according to the substance can be used. In the present invention, as the plating metal, gold, silver, copper, chromium and nickel are preferable, and chromium and nickel are particularly preferable. As the body material, carbon steel and stainless steel, which are inexpensive and usable at high temperatures (300° to 350° C.), are usually preferable.

In method (2), the shape and morphology of the additive is not critical. Additives made of the substance and having a form of powder, granule, rod, plate, cylinder, mass or ribbon can be used, for example. Among these forms, powdery form is particularly preferred. Additives having a surface layer of the above-described substance are also used.

In method (2), the amount of the additive is about 1 ppm to about 1% by weight, preferably 5 ppm to 5,000 ppm, and still preferably about 20 ppm to about 1,000 ppm, based on the total weight of the reactants. If its amount is smaller than 1 ppm, the formed polycarbonate has a low molecular weight and is readily colored. If its amount is larger than 1% by weight, the procedure for separating the additive is complicated.

In this method, the material for constructing the reactor is not critical, and reactors made of metals such as carbon steel, stainless steel or the like, and those made of glass or lined with glass can be used.

In the present invention, method (2) can be conducted in combination with method (1).

Next, processes for producing polycarbonate by transesterification, which comprise reacting reactants in a reactor which is made of stainless steel and treated on a surface part thereof to contact the reactants, will be described in detail. These processes are industrially practicable and satisfy the economic requirements though stainless steel is generally usable and inexpensive.

The conventional process for the production of polycarbonate using a reactor made of stainless steel by transesterification has a tendency to give yellow or brown products. This coloring might be presumed to result from the acceleration of thermal decomposition and side reaction of the reactants at high temperature by the interaction of a metal component in stainless steel with a transesterification catalyst, though the factors thereof are not apparent.

However, the processes of the present invention surprisingly give a colorless and transparent polycarbonate having a high molecular weight by using a reactor which is made of stainless steel and treated by electropolishing or buffed.

Further, the process of the present invention which comprises using a reactor which is made of stainless steel and treated by acid pickling, gives a colorless and transparent polycarbonate having a high molecular weight because the acid pickling inhibits the factors which accelerate thermal decomposition and side reaction of the reactants at high temperature resulting from the interaction of stainless steel with a transesterification catalyst or a reaction system by the formation of the passive state on the surface of stainless steel or change in the activated states of the surface, though the mechanism thereof has not been sufficiently elucidated.

The stainless steel to be used in these invention includes SUS 304, SUS 304 L, SUS 316, SUS 316 L and the like, though it is not restricted to them.

The term "electropolishing" used herein means a method for polishing a surface to give a glossy surface by the anodic reaction by using an electrolytic solution which preferentially dissolves minute projections present on the anodic metal surface rather than minute recesses. As the electrolytic solution, a mixture of sulfuric acid or perchloric acid, phosphoric acid, ethanol and glycerol can be referred to.

The pickling in the present invention refers to a process generally performed for scale removal or the passivation of metal by dipping the metal into an acid solution. Particularly, stainless steel produces an oxide layer, that is, various scales, on the surface thereof by the thermal working thereof, such as forging, hot rolling and heat-treating. By dipping the scaly metal (stainless steel) into the acid solution, the base iron is dissolved as an anode(+) to generate an equivalent amount of hydrogen ions on the surface of the oxide. The scales are believed to be mechanically removed by the hydrogen gas thus produced rather than the scales being dissolved by the acid solution and removed.

The acid used for the acid pickling includes nitric acid, sulfuric acid, hydrofluoric acid, hydrochloric acid and phosphoric acid. The acid pickling is generally conducted by, for example, dipping stainless steel into a solution which contains 40 to 45% by weight of hydrochloric acid and 5 to 15% by weight of nitric acid at ordinary temperature to 50° C., brushing the dipped stainless steel, washing the brushed stainless steel with water, and drying the washed stainless steel.

The buffing in the present invention refers to buff polishing or buff finishing as prescribed by JIS H 0400-1961 which is generally known as a means for smoothing the surface of stainless steel. Although the extent of buffing is not particularly restricted, it is preferable to use a buffing compound having a particle size of 80 μm (#200) or below (JIS R 6001-1956).

The reactor according to the present invention also includes one which is made of stainless steel and treated by acid pickling in combination with further treatment such as buffing.

The reactor according to the present invention is treated by above-described method on a surface part thereof to contact the reactants. Namely, the reactor has a buffed inner wall which the reactants contact, for example.

In the present invention, the aforementioned additives can be used in combination with the above-described treated reactor for transesterification reaction.

In the process of the present invention, the reaction is carried out usually in the presence of a transesterification catalyst. As typical examples of the transesterification catalyst, the following catalysts (A), (B), (C), (D) and (E) can be mentioned.

(A) Metal-containing catalysts

The metal-containing catalysts include, for example, metal borohydrides such as lithium borohydride, sodium borohydride, potassium borohydride, rubidium borohydride, cesium borohydride, beryllium borohydride, magnesium borohydride, calcium borohydride, strontium borohydride, barium borohydride, aluminum borohydride, titanium borohydride, tin borohydride, germanium borohydride and the like; metal tetraphenoxides such as tetraphenoxylithium, tetraphenoxysodium, tetraphenoxypotassium, tetraphenoxyrubidium, tetraphenoxycesium and the like; sodium thiosulfate; metal oxides such as beryllium oxide, magnesium oxide, antimony trioxide, tin (IV) oxide and the like; dibutylin oxide; metal hydroxides such as beryllium hydroxide, magnesium hydroxide, germanium hydroxide and the like; metal acetates such as beryllium acetate, zinc acetate, magnesium acetate, tin (IV) acetate and the like; metal carbonates such as lithium carbonate, sodium carbonate, potassium carbonate, beryllium carbonate, magnesium carbonate, tin (IV) carbonate, germanium carbonate and the like; metal nitrates such as tin (IV) nitrate, germanium nitrate and the like; metal phenylacetates such as zinc phenylacetate, lead phenylacetate, tin phenylacetate and the like; bismuth trimethylcarboxylate; etc.

(B) Catalysts belonging to nitrogen-containing, electron-donating compounds including primary amines, secondary amines, tertiary amines, nitrogen-containing heterocyclic compounds and the like.

Examples of such catalysts include N,N-dimethyl4-aminopyridine (represented by 4-dimethylaminopyridine, hereinafter), N,N-diethyl-4- aminopyridine, 4-pyrrolidinopyridine, pyridine, 4-aminopyridine, 2-aminopyridine, 2-hydroxypyridine, 4- hydroxypyridine, 2-methoxypyridine, 4-methoxypyridine, picoline, pyrimidine, 2-dimethylaminoimidazole, 2-methoxyimidazole, 2-mercaptoimidazole, aminoquinoline, imidazole, 2-methylimidazole, 4-methylimidazole, pyrazole; benzimidazole, N,N-dimethylaniline, pyrrolidine, morphaline, N-methylmorpholine, piperidine, piperazine, 1,4-diazabicyclo[2.2.2]octane (DABCO), 1,8-diazabicyclo[5.4.0]-7-undecene (DBU), 1,5-diazabicyclo[4.3.0]-5-nonene (DBN) and the like.

(C) Salts formed between the above-mentioned nitrogen-containing electron-donating compounds and acids such as carbonic acid, acetic acid, formic acid, nitric acid, nitrous acid, oxalic acid, borofluoric acid, hydrofluoric acid and the like.

(D) Catalysts belonging to electron-donating phosphorus compounds

Examples of such catalysts include triethylphosphine, tri-n-propylphosphine, triisopropylphosphine, tri-n-butylphosphine, triphenylphosphine, tri-o-dimethoxyphenylphosphine, tri-p-tolylphosphine, tri-o-tolylphosphine, tributyl phosphite, triphenyl phosphite, tri-p-tolyl phosphite, tri-o-tolyl phosphite and the like.

(E) Catalysts belonging to borane complexes

Examples of such catalysts include complexes formed between borane and ammonia, dimethylamine, trimethylamine, triethylamine, t-butylamine, dimethylaniline, pyridine, dimethylaminopyridine, morpholine, piperazine, pyrrole, tetrahydrofuran, dimethyl sulfide, tri-n-butylphosphine, triphenylphosphine, triphenyl phosphite and the like.

These transesterification catalysts may be used either alone or in the form of a mixture of two or more members among them.

Among these transesterification catalysts, preferable are (a) a nitrogen-containing, electron-donating compound and (b) a mixture of a nitrogen-containing, electron-donating compound and an alkali metal compound or an alkaline earth metal compound. Among them, 2-methylimidazole, 4-dimethylaminopyridine and a mixture of 4-dimethylaminopyridine and potassium acetate are more preferable.

The alkali metal compound and alkaline earth metal compound include oxides, hydroxides, organic acid salts, carbonates, hydrogencarbonates, thiosulfates, borohydrides and the like of alkali metals and alkaline earth metals. As the examples of such compounds, the compounds which have been mentioned in paragraph (A) and fulfil the conditions of this paragraph can be referred to.

The amount of the transesterification catalyst may be any so long as the polycondensation reaction is not disturbed by its use. For example, the catalyst is used in an amount of $10^{-7}$ to $10^{-1}$ mol, preferably about $10^{-5}$ to $10^{-1}$ mol, more preferably about $10^{-5}$ to $10^{-2}$ mol, most preferably about $10^{-4}$ to $10^{-2}$ mol, per mole of the dihydroxy compound. If the amount of the catalyst is smaller than $10^{-7}$ mol per mole of the dihydroxy compound, the rate of the polymerization reaction to form the polycarbonate is low because the catalytic activity is low. If the amount of the catalyst is larger than $10^{-1}$ mol, the catalyst remains in the formed polycarbonate to deteriorate the properties of the polycarbonate.

The transesterification reaction is carried out usually at a temperature of about 100° C. to 300° C., preferably at about 130° C. to 280° C. If the reaction temperature is lower than 100° C., the reaction velocity is low. If the reaction temperature is higher than 300° C., side reactions readily take place. It is also possible to carry out the reaction according to the conventional procedure adopted in melt-polycondensation reactions, i.e. by carrying out the early stage of the reaction at 100° C. to 250° C., preferably at about 130° C. to 230° C., and thereafter elevating the temperature while reducing the pressure, and finally carrying out the reaction at about 250° C. to 300° C. Preferably, the pressure at the completing of the reaction is 0.3 Torr or below, for example.

The polycarbonate obtained according to the process of the present invention has a high molecular weight, free from coloration and has excellent mechanical and electrical properties, heat resistance, transparency and light resistance. Thus, it can be used as electronic and electrical mca parts, mechanical parts, structural materials, films, sheets, containers, etc.

According to the process of the present invention, a transesterification reaction between a dihydroxy compound and a diester of carbonic acid is carried out while contacting the reactants with a specified substance or in a treated stainless steel reactor. Therefore, there can be obtained a colorless, transparent polycarbonate which is free from coloration in spite of its high molecular weight.

The present invention will now be described by referring to the following Examples, though the present invention is not limited to theme.

(EXAMPLE)

In the Examples and Comparative Examples, the viscosity-average molecular weight ($\overline{Mv}$) of a polymer was determined by measuring the intrinsic viscosity $[\eta]$ of a methylene chloride solution of a polycarbonate sample at 20° C. with a Ubbellohde viscometer, followed by calculation according to the following equation:

$$[\eta] = 1.11 \times 10^{-4} (\overline{Mv})^{0.82}.$$

The hue of a polymer was evaluated by determining the absorbances of a 10% solution of a polycarbonate sample in methylene chloride at wavelengths of 380 nm and 580 nm with an UV spectrophotometer and calculating the difference between the absorbances. A greater value means a higher extent coloration.

EXAMPLE 1

22.8 g (0.1 mol) of 2,2-bis(4-hydroxyphenyl)-propane, 0.164 g ($2 \times 10^{-3}$ mol) of 2-methylimidazole and 21.9 g (0.1023 mol) of bisphenyl carbonate were fed into a reaction vessel made of Monel 400 (comprising 66.5wt. % of Ni, 31.5wt. % of Cu and 2wt. % of Fe). The contents were stirred at 180° C. in a nitrogen gas atmosphere for 1 hour. Then, the reaction system was heated while reducing the pressure gradually and reached 270° C. and 0.1 Torr finally. The contents were polycondensed at the condition (270° C. and 0.1 Tort) for 2 hours, while distilling off the formed phenol. Thus, a colorless transparent polycarbonate was obtained.

The viscosity-average molecular weight ($\overline{Mv}$) of the polycarbonate was 28,000, while the hue ($A_{380} - A_{580}$) thereof was 0.110.

EXAMPLE 2

A polycarbonate was prepared in the same manner as that of Example 1 except that 0.0122 g ($1 \times 10^{-4}$ mol) of 4-dimethylaminopyridine was used as a transesterification catalyst instead of the 2-methylimidazole.

The viscosity-average molecular weight ($\overline{Mv}$) of the polycarbonate was 30,800, while the hue ($A_{380} - A_{580}$) thereof was 0.108.

EXAMPLE 3

A polycarbonate was prepared in the same manner as that of Example 2 except that a reaction vessel made of Inconel 600 (comprising 76wt. % of Ni, 15.5wt. % of Cr and 8wt. % of Fe) was used.

The viscosity-average molecular weight ($\overline{Mv}$) of the polycarbonate was 29,700, while the hue ($A_{380} - A_{580}$) thereof was 0.110.

EXAMPLE 4

A Polycarbonate was prepared in the same manner as that of Example 2 except that a reaction vessel made of Hastelloy B-2 (comprising 68wt. % of Ni, 28wt. % of Cr and 4wt. % of Fe) was used.

The viscosity-average molecular weight ($\overline{Mv}$) of the polycarbonate was 28,900, while the hue ($A_{380} - A_{580}$) thereof was 0.105.

EXAMPLE 5

22.8 g (0.1 mol) of 2,2-bis(4-hydroxyphenyl)-propane, 0.0164 g ($2 \times 10^{-4}$ mol) of 2-methylimidazole and 21.9 g (0.1023 mol) of bisphenyl carbonate were fed into a reaction vessel made of Inconel 657 (comprising 50wt. % of Cr, 48wt. % of Ni and 1.5wt. % of Nb). The contents were stirred at 180° C. in a nitrogen gas atmosphere for 1 hour. Then, the reaction system was heated while reducing the pressure gradually and reached 270°

C. and 0.1 Torr finally. The contents were polycondensed at the condition (270° C. and 0.1 Torr) for 2 hours, while distilling off the formed phenol. Thus, a colorless transparent polycarbonate was obtained.

The viscosity-average molecular weight ($\overline{Mv}$) of the polycarbonate was 31,000, while the hue ($A_{380}-A_{580}$) thereof was 0.008.

EXAMPLE 6

A polycarbonate was prepared in the same manner as that of Example 5 except that a reaction vessel made of Nimonic 80A (comprising 76wt. % of Ni, 19.5wt. % of Cr, 2 4wt. % of Ti, 14wt. % of Al and 0.06wt. % of Zr) and 0.0061 g ($5\times10^{-5}$ mol) of 4-dimethylaminopyridine, as a transesterification catalyst instead of the 2-methylimidazole, were used.

The viscosity-average molecular weight ($\overline{Mv}$) of the polycarbonate was 29,000, while the hue ($A_{380}-A_{580}$) thereof was 0.108.

EXAMPLE 7

A polycarbonate was prepared in the same manner as that of Example 5 except that a reaction vessel made of Nickel 200 (comprising 99.5wt. % of Ni and 0.08wt. % of C) was used.

The viscosity-average molecular weight ($\overline{Mv}$) of the polycarbonate was 33,000, while the hue ($A_{380}-A_{580}$) thereof was 0.08.

EXAMPLE 8

A polycarbonate was prepared in the same manner as that of Example 7 except that 0.0061 g ($5\times10^{-5}$ mol) of 4-dimethylaminopyridine was used as a transesterification catalyst instead of the 2-methylimidazole.

The viscosity-average molecular weight ($\overline{Mv}$) of the polycarbonate was 33,000, while the hue ($A_{380}-A_{580}$) thereof was 0.07.

EXAMPLE 9

A polycarbonate was prepared in the same manner as that of Example 5 except that a reaction vessel made of Hastelloy B (comprising 64wt. % of Ni, 28wt. % of Mo, 5wt. % of Fe, 1.0wt. % of Cr, 0 8wt. % of Mn and 0.7wt. % of Si) was used.

The viscosity-average molecular weight ($\overline{Mv}$) of the polycarbonate was 29,000, while the hue ($A_{380}-A_{580}$) thereof was 0.10.

EXAMPLE 10

A polycarbonate was prepared in the same manner as that of Example 6 except that a reaction vessel made of Hastelloy C (comprising 57wt. % of Ni, 17wt. % of Mo, 16.5wt. % of Cr, 5wt. % of Fe, 2.5wt. % of Co, 0.8wt. % of Mn and 0.7wt. % of Si) was used.

The viscosity-average molecular weight ($\overline{Mv}$) of the polycarbonate was 38,000, while the hue ($A_{380}-A_{580}$) thereof was 0.07.

EXAMPLE 11

A polycarbonate was prepared in the same manner as that of Example 5 except that a reaction vessel made of Duranickel 301 (comprising 95wt. % of Ni, 4 4wt. % of Al and 0.6wt. % of Ti) was used.

The viscosity-average molecular weight ($\overline{Mv}$) of the polycarbonate was 31,000, while the hue ($A_{380}-A_{580}$) thereof was 0.08.

EXAMPLE 12

A polycarbonate was prepared in the same manner as that of Example 11 except that 0.0061 g ($5\times10^{-5}$ mol) of 4-dimethylaminopyridine and 0.00049 g ($5\times10^{-6}$ mol) of potassium acetate were used as transesterification catalysts instead of the 2-methylimidazole.

The viscosity-average molecular weight ($\overline{Mv}$) of the polycarbonate was 34,000, while the hue ($A_{380}-A_{580}$) thereof was 0.08.

EXAMPLE 13

A polycarbonate was prepared in the same manner as that of Example 5 except that a reaction vessel made of Cupronickel C7060 (comprising 90wt. % of Cu and 10wt. % of Ni) was used.

The viscosity-average molecular weight ($\overline{Mv}$) of the polycarbonate was 34,000, while the hue ($A_{380}-A_{580}$) thereof was 0.11.

EXAMPLE 14

A polycarbonate was prepared in the same manner as that of Example 6 except that a reaction vessel made of Cupronickel C7100 (comprising 80wt. % of Cu and 20wt. % of Ni) was used.

The viscosity-average molecular weight ($\overline{Mv}$) of the polycarbonate was 32,000, while the hue ($A_{380}-A_{58}$) thereof was 0.07.

EXAMPLE 15

A polycarbonate was prepared in the same manner as that of Example 5 except that a reaction vessel made of Cupronickel C7150 (comprising 70wt. % of Cu and 30wt. % of Ni) and 0. 0061 g ($5\times10^{-5}$ mol) of 4-dimethylaminopyridine and 0. 0002 g ($2\times10^{-6}$ mol) of potassium acetate, as transesterification catalysts instead of the 2-methylimidazole, were used.

The viscosity-average molecular weight ($\overline{My}$) of the polycarbonate was 36,000, while the hue ($A_{380}-A_{580}$) thereof was 0.09.

EXAMPLE 16

A polycarbonate was prepared in the same manner as that of Example 5 except that a reaction vessel made of Aluminium bronze C8301 (comprising 80wt. % of Cu, 9.5wt. % of Ni and 5wt. % of Fe) was used.

The viscosity-average molecular weight ($\overline{Mv}$) of the polycarbonate was 32,000, while the hue ($A_{380}-A_{580}$) thereof was 0.09.

EXAMPLE 17

A polycarbonate was prepared in the same manner as that of Example 6 except that a reaction vessel made of Aluminium bronze AlBC3 (comprising 81wt. % of Cu, 9.5wt. % of Al 4.5wt. % of Ni and 4.5wt. % of Fe) was used.

The viscosity-average molecular weight ($\overline{Mv}$) of the polycarbonate was 32,500, while the hue ($A_{380}-A_{580}$) thereof was 0.10.

EXAMPLE 18

A polycarbonate was prepared in the same manner as that of Example 5 except that a reaction vessel made of Admiralty brass C4430 (comprising 71wt. % of Cu, 28wt. % of Zn and 1 wt. % of Sn) was used.

The viscosity-average molecular weight ($\overline{Mv}$) of the polycarbonate was 28,500, while the hue ($A_{380}-A_{580}$) thereof was 0.12.

EXAMPLE 19

A polycarbonate was prepared in the same manner as that of Example 6 except that a reaction vessel made of Naval brass C4640 (comprising 60wt. % of Cu, 39wt. % of Zn and 0.wt. % of Sn) was used.

The viscosity-average molecular weight ($\overline{Mv}$) of the polycarbonate was 27,500, while the hue ($A_{380}$–$A_{580}$) thereof was 0.08.

EXAMPLE 20

A polycarbonate was prepared in the same manner as that of Example 5 except that a reaction vessel made of Haynes 36 (comprising 54wt. % of Co, 18.5wt. % of Cr, 14.5wt. % of W, 10wt. % of Mo, 1.2wt. % of Mn, 0.9wt. % of Fe, 0.5wt. % of Si and 0.4wt. % of C) was used.

The viscosity-average molecular weight ($\overline{Mv}$) of the polycarbonate was 32,900, while the hue ($A_{380}$–$A_{580}$) thereof was 0.06.

EXAMPLE 21

A polycarbonate was prepared in the same manner as that of Example 6 except that a reaction vessel made of Stelite 21 (comprising 62wt. % of Co, 27wt. % of Cr, 5.5wt. % of Mo, 3wt. % of Ni, 1wt. % of Fe, 0.6wt. % of Mn, 0.6wt. % of Si and 0.25wt. % of C) was used.

The viscosity-average molecular weight ($\overline{Mv}$) of the polycarbonate was 30,200, while the hue ($A_{380}$–$A_{580}$) thereof was 0.07.

EXAMPLE 22

A polycarbonate was prepared in the same manner as that of Example 5 except that a reaction vessel made of Stelite 21 (comprising 55wt. % of Co, 25wt. % of Cr, 10wt. % of Ni, 8wt. % of W, 1wt. % of Fe, 0.6wt. % of Mn, 0.6wt. % of Si and 0.5wt. % of C) and 0.0024 g ($2 \times 10^{-5}$ mol) of 4-dimethylaminopyridine and 0.0002 g ($2 \times 10^{-6}$ mol) of potassium acetate, as transesterification catalysts instead of the 2-methylimidazole, were used.

The viscosity-average molecular weight ($\overline{Mv}$) of the polycarbonate was 29,000, while the hue ($A_{380}$–$A_{580}$) thereof was 0.09.

EXAMPLE 23

A polycarbonate was prepared in the same manner as that of Example 5 except that a reaction vessel made of corrosion resistance aluminium alloy (comprising 97wt. % of Al, 1.5wt. % of Mn, 0.7wt. % of Fe, 0.6wt. % of Si and 0.2wt. % of Cu) was used.

The viscosity-average molecular weight ($\overline{Mv}$) of the polycarbonate was 32,300, while the hue ($A_{380}$–$A_{580}$) thereof was 0.08.

EXAMPLE 24

A polycarbonate was prepared in the same manner as that of Example 6 except that a reaction vessel made of corrosion resistance aluminium alloy (comprising 97.8wt. % of Al, 1.2wt. % of Mn and 1.0wt. % of Mg) was used.

The viscosity-average molecular weight ($\overline{Mv}$) of the polycarbonate was 28,800, while the hue ($A_{380}$–$A_{580}$) thereof was 0.06.

EXAMPLE 25

A polycarbonate was prepared in the same manner as that of Example 24 except that 0.0024 g ($2 \times 10^{-5}$ mol) of 4-dimethylaminopyridine and 0.0002 g ($2 \times 10^{-6}$ mol) of potassium acetate were used as transesterification catalysts instead of the 2-methylimidazole.

The viscosity-average molecular weight ($\overline{Mv}$) of the polycarbonate was 33,000, while the hue ($A_{380}$–$A_{580}$) thereof was 0.07.

EXAMPLE 26

A polycarbonate is prepared in the same manner as that of Example 12 except that a reaction vessel made of Incoloy 825 (comprising 42wt. % of Ni, 21.5wt. % of Cr, 3wt. % of Mo, 2.2wt. % of Cu and 30wt. % of Fe)is used.

The viscosity-average molecular weight ($\overline{Mv}$) of the polycarbonate is 32,000, while the hue ($A_{380}$–$A_{580}$) thereof is 0.10.

EXAMPLE 27

A polycarbonate is prepared in the same manner as that of Example 12 except that a reaction vessel made of Incoloy 800 (comprising 32.5wt. % of Ni, 21wt. % of Cr and 46.5wt. % of Fe) is used.

The viscosity-average molecular weight ($\overline{Mv}$) of the polycarbonate is 29,000, while the hue ($A_{380}$–$A_{580}$) thereof is 0.11.

EXAMPLE 28

A 20-1 tank equipped with a stirrer of which liquid-contacting parts had been Cr-plated was charged with 4,566 g (20.0 mol) of bisphenol A, 4,392 g (20.5 mol) of diphenyl carbonate, 0.489 g (0.004 mol) of 4-dimethylaminopyridine and 0.039 g (0.0004 mol) of potassium acetate. After replacing the inner atmosphere with nitrogen gas, the temperature was elevated to 180° C., where the contents in the tank were molten to form a uniform mixture under stirring. Then, the temperature was slowly elevated up to 260° C., while reducing the pressure down to 2 Torr. The contents were polycondensed at the condition (260° C. and 2 Torr) for 4 hours, while distilling off the phenol formed as a by-product. Thus, a polycarbonate prepolymer having a viscosity-average molecular weight of 15,000 was obtained. The polycarbonate prepolymer thus obtained was sent into a self-cleaning twin-screw extruder regulated at 280° C./0.2 Torr and having a Cr-plated liquid-contacting part, and discharged by means of a gear pump at 850 g/hr.

The polymer thus obtained had a viscosity-average molecular weight ($\overline{Mv}$) of 28,000 and its hue ($A_{380}$–$A_{580}$) was 0.07.

EXAMPLE 29

A reaction was carried out in the same manner as that of Example 28, except that the liquid-contacting part of the reactor had been plated with Ni instead of Cr.

The polymer thus obtained had a viscosity-average molecular weight ($\overline{Mv}$) of 27,000, and its hue ($A_{380}$–$A_{580}$) was 0.09.

EXAMPLE 30

A reaction is carried out in the same manner as that of Example 5, except that a reactor of which the liquid-contacting parts have a flame spray coating ceramic layer of aluminium oxide ($Al_2O_3$) is used.

The viscosity-average molecular weight ($\overline{Mv}$) of the polycarbonate is 30,500, while the hue ($A_{380}$–$A_{580}$) thereof is 0.07.

EXAMPLE 31

A reaction is carried out in the same manner as that of Example 6, except that a reactor of which the liquid-contacting parts have a flame spray coating ceramic layer of boron nitride (BN) is used.

The viscosity-average molecular weight ($\overline{Mv}$) of the polycarbonate is 34,000, while the hue ($A_{380}-A_{580}$) thereof is 0.06.

EXAMPLE 32

A reaction is carried out in the same manner as that of ]Example 6, except that a reactor of which the liquid-contacting parts have a flame spray coating ceramic layer of silicon nitride ($Si_3N_4$) is used.

The viscosity-average molecular weight ($\overline{Mv}$) of the polycarbonate is 35,600, while the hue ($A_{380}-A_{580}$) thereof is 0.05.

EXAMPLE 33

A reaction was carried out with the same formulation as that of Example 6, provided that a reactor made of Pyrex glass was used, and 40 ppm of Cr powder, 30 ppm of Ni powder, 15 ppm of Fe powder and 15 ppm of Mo powder, based on all of the starting materials, were added.

The polycarbonate thus obtained had a viscosity-average molecular weight ($\overline{Mv}$) of 33,000, and its hue ($A_{380}-A_{580}$) was 0.06.

EXAMPLE 34

A reaction was carried out in the same manner as that of Example 33, except that the amounts of Cr powder and Ni powder were 90 ppm and 10 ppm, respectively.

The polycarbonate thus obtained had a viscosity-average molecular weight ($\overline{Mv}$) of 82,000, and its hue ($A_{380}-A_{580}$) was 0.10.

EXAMPLE 35

The procedure of Example 34 was repeated, except that 0.0061 g ($5 \times 10^{-5}$ mol) of 4-dimethylaminopyridine and 0.00049 g ($5 \times 10^{-6}$ mol) of potassium acetate were used as transesterification catalysts.

The polycarbonate thus obtained had a viscosity-average molecular weight ($\overline{Mv}$) of 34,000, and its hue ($A_{380}-A_{580}$) was 0.06.

EXAMPLE 36

A reaction was carried out in the same manner as that of Example 33, provided that 85 ppm of Ni powder and 15 ppm of C powder, based on all of the starting materials, were added.

The polycarbonate thus obtained had a viscosity-average molecular weight ($\overline{Mv}$) of 27,000, and its hue ($A_{380}-A_{580}$) was 0.10.

EXAMPLE 37

A reaction was carried out in the same manner as that of Example 36, except that the amounts of Ni powder and C powder were 50 ppm and 50 ppm, respectively.

The polycarbonate thus obtained had a viscosity-average molecular weight ($\overline{Mv}$) of 28,000, and its hue ($A_{380}-A_{580}$) was 0.11.

EXAMPLE 38

A reaction was carried out in the same manner as that of Example. 33, provided that 35 ppm of Ni powder, 35 ppm of C powder, 15 ppm of Fe powder and 15 ppm of Mo powder, based on all of the starting materials, were added.

The polycarbonate thus obtained had a viscosity-average molecular weight ($\overline{Mv}$) of 27,500, and its hue ($A_{380}-A_{580}$) was 0.10.

EXAMPLE 39

The procedure of Example 38 was repeated, except that 0.0061 g ($5 \times 10^{-5}$ mol) of 4-dimethylaminopyridine and 0.00049 g ($5 \times 10^{-6}$ mol) of potassium acetate were used as transesterification catalysts.

The polycarbonate thus obtained had a viscosity-average molecular weight ($\overline{Mv}$) of 34,000, and its hue ($A_{380}-A_{580}$) was 0.08.

EXAMPLE 40

A reaction was carried out in the same manner as that of Example 33, provided that 90 ppm of Ni powder and 10 ppm of Mo powder, based on all of the starting materials, were added.

The: polycarbonate thus obtained had a viscosity-average molecular weight ($\overline{Mv}$) of 32,500, and its hue ($A_{380}-A_{580}$) was 0.09.

EXAMPLE 41

A reaction was carried out in the same manner as that of Example 40, except that the amounts of Ni powder and Mo powder were 5 ppm and 95 ppm, respectively.

The polycarbonate thus obtained had a viscosity-average molecular weight ($\overline{Mv}$) of 29,500, and its hue ($A_{380}-A_{580}$) was 0.10.

EXAMPLE 42

The procedure of the Example 40 was repeated, except that 0.0061 g ($5 \times 10^{-5}$ mol) of 4-dimethylaminopyridine and 0.00049 g ($5 \times 10^{-6}$ mol) of potassium acetate were used as transesterification catalysts.

Thee polycarbonate thus obtained had a viscosity-average molecular weight ($\overline{Mv}$) of 35,000, and its hue ($A_{380}-A_{580}$) was 0.07.

EXAMPLE 43

A reaction was carried out with the same formulation as that of Example 12, provided that a reactor made of Pyrex glass was used, and 70 ppm of Ni powder and 30 ppm of Al powder, based on all of the starting materials, were added.

The polycarbonate thus obtained had a viscosity-average molecular weight ($\overline{Mv}$) of 33,000, and its hue ($A_{380}-A_{580}$) was 0.06.

EXAMPLE 44

A reaction was carried out in the same manner as that of Example 43, except that the amounts of Ni powder and Al powder were 50 ppm and 50 ppm, respectively.

The polycarbonate thus obtained had a viscosity-average molecular weight ($\overline{Mv}$) of 32,000, and its hue ($A_{380}-A_{580}$) was 0.10.

EXAMPLE 45

A reaction was carried out in the same manner as that of Example 43, provided that 35 ppm of Ni powder, 35 ppm of Al powder, 15 ppm of Fe powder and 15 ppm of Mo powder, based on all of the starting materials, were added.

The polycarbonate thus obtained had a viscosity-average molecular weight ($\overline{M}v$) of 29,000, and its hue ($A_{380}$–$A_{580}$) was 0.115.

EXAMPLE 46

A reaction was carried out in the same manner as that of Example 43, provided that 70 ppm of Ni powder and 30 ppm of Al powder, based on all of the starting materials, were added.

The polycarbonate thus obtained had a viscosity-average molecular weight ($\overline{M}v$) of 35,000, and its hue ($A_{380}$–$A_{580}$) was 0.07.

EXAMPLE 47

A reaction was carried out in the same manner as that of Example 33, provided that 100 ppm of Cu powder, based on all of the starting materials, was added.

The polycarbonate thus obtained had a viscosity-average molecular weight ($\overline{M}v$) of 29,000, and its hue ($A_{380}$–$A_{580}$) was 0.09.

EXAMPLE 48

A reaction was carried out in the same manner as that of Example 33, provided that 20 ppm of Cu powder and 80 ppm of Ni powder, based on all of the starting materials, were added.

The polycarbonate thus obtained had a viscosity-average molecular weight ($\overline{M}v$) of 34,000, and its hue ($A_{380}$–$A_{580}$) was 0.12.

EXAMPLE 49

A reaction was carried out in the same manner as that of Example 33, provided that 60 ppm of Cu powder and 40 ppm of Al powder, based on all of the starting materials, were added.

The polycarbonate thus obtained had a viscosity-average molecular weight ($\overline{M}v$) of 28,000, and its hue ($A_{380}$–$A_{580}$) was 0.10.

EXAMPLE 50

A reaction was carried out in the same manner as that of Example 49, except that the amounts of Cu powder and Al powder were 10 ppm and 90 ppm, respectively.

The polycarbonate thus obtained had a viscosity-average molecular weight ($\overline{M}v$) of 28,700, and its hue ($A_{380}$–$A_{580}$) was 0.07.

EXAMPLE 51

A reaction was carried out in the same manner as that of Example 33, provided that 20 ppm of Cu powder and 80 ppm of Zn powder, based on all of the starting materials, were added.

The polycarbonate thus obtained had a viscosity-average molecular weight ($\overline{M}v$) of 28,700, and its hue ($A_{380}$–$A_{580}$) was 0.11.

EXAMPLE 52

A reaction was carried out in the same manner as that of Example 51, except that the amounts of Cu powder and Zn powder were 50 ppm and 50 ppm, respectively.

The polycarbonate thus obtained had a viscosity-average molecular weight ($\overline{M}v$) of 29,800, and its hue ($A_{380}$–$A_{580}$) was 0.10.

EXAMPLE 53

A reaction was carried out in the same manner as that of Example 33, provided that 100 ppm of Zn powder, based on all of the starting materials, was added.

The polycarbonate thus obtained had a viscosity-average molecular weight ($\overline{M}v$) of 30,500, and its hue ($A_{380}$–$A_{580}$) was 0.08.

EXAMPLE 54

A reaction was carried out in the same manner as that of Example 33, provided that 90 ppm of Co powder and 10 ppm of Cr powder, based on all of the starting materials, were added.

The polycarbonate thus obtained had a viscosity-average molecular weight ($\overline{M}v$) of 29,600, and its hue ($A_{380}$–$A_{580}$) was 0.10.

EXAMPLE 55

A reaction was carried out in the same manner as that of Example 54, except that the amounts of Co powder and Cr powder were 10 ppm and 90 ppm, respectively.

The polycarbonate thus obtained had a viscosity-average molecular weight ($\overline{M}v$) of 31,600, and its hue ($A_{380}$–$A_{580}$) was 0.11.

EXAMPLE 56

A reaction was carried out in the same manner as that of Example 33, provided that 100 ppm of Co powder, based on all of the starting materials, was added.

The polycarbonate thus obtained had a viscosity-average molecular weight ($\overline{M}v$) of 28,500, and its hue ($A_{380}$–$A_{580}$) was 0.10.

EXAMPLE 57

A reaction was carried out in the same manner as that of Example 33, provided that 100 ppm of Cr powder, based on all of the starting materials, was added.

The polycarbonate thus obtained had a viscosity-average molecular weight ($\overline{M}v$) of 29,000, and its hue ($A_{380}$–$A_{580}$) was 0.08.

Example 58

A reaction was carried out in the same manner as that of Example 33, provided that 50 ppm of Al powder and 50 ppm of Mn powder, based on all of the starting materials, were added.

The polycarbonate thus obtained had a viscosity-average molecular weight ($\overline{M}v$) of 27,500, and its hue ($A_{380-580}$) was 0.10.

EXAMPLE 59

A reaction was carried out in the same manner as that of Example 58, except that the amounts of Al powder and Mn powder were 10 ppm and 90 ppm, respectively.

The polycarbonate thus obtained had a viscosity-average molecular weight ($\overline{M}v$) of 28,400, and its hue ($A_{380}$–$A_{580}$) was 0.11.

EXAMPLE 60

A reaction was carried out in the same manner as that of Example 33, provided that 100 ppm of Al powder, based on all of the starting materials, was added.

The polycarbonate thus obtained had a viscosity-average molecular weight ($\overline{M}v$) of 29,500, and its hue ($A_{380}$–$A_{580}$) was 0.09.

EXAMPLE 61

A reaction was carried out in the same manner as that of Example 33, provided that 100 ppm of Mn powder, based on all of the starting materials, was added.

The polycarbonate thus obtained had a viscosity-average molecular weight ($\overline{M}v$) of 30,500, and its hue ($A_{380}-A_{580}$) was 0.10.

EXAMPLE 62

A reaction was carried out in the same manner as that of Example 28, except that a reactor made of stainless steel (SUS 316) and the liquid-contacting part thereof having been electropolished was used.

This polymer thus obtained had a viscosity-average molecular weight ($\overline{M}v$) of 28,000, and its hue ($A_{380}-A_{580}$) was 0.09.

EXAMPLE 63

A reactor made of stainless steel (SUS 316) was charged with a 0.1 N aqueous solution of nitric acid, left as it was for about 20 hours, washed with water and dried.

The reactor thus obtained was charged with 22.8 g (0.1 mol) of 2,2-bis(4-hydroxyphenyl)propane, 0.164 g ($2\times10^{-3}$ mol) of 2-methylimidazole and 21.4 g (0.1 mol) of bisphenyl carbonate. The contents were stirred at 180° C. for 1 hour under a nitrogen gas atmosphere. Then, the reaction system was heated while reducing the pressure gradually and reached 270° C. and 0.1 Torr finally. The contents were polycondensed at the condition (270° C. and 0.1 Torr) for 1 hour while distilling off the formed phenol to obtain a colorless and transparent polycarbonate.

The polycarbonate thus obtained had a viscosity-average molecular weight ($\overline{M}v$) of 27,000 and a hue ($A_{380}-A_{580}$) of 0.108.

EXAMPLE 64

A reactor made of stainless steel (SUS 304) was charged with a 0.1N aqueous solution of nitric acid, left as it was for about 20 hours, washed with water and dried.

Using the reactor thus obtained, a reaction similar to that of Example 63 was carried out to obtain 5 polycarbonate.

The polycarbonate thus obtained had a viscosity-average molecular weight ($\overline{M}v$) of 28,000 and a hue ($A_{380}-A_{580}$) of 0.121.

EXAMPLE 65

A reactor made of stainless steel (SUS 316) was charged with a 0.1N aqueous solution of nitric acid, left as it was for about 20 hours, washed with water and dried.

The reactor thus obtained was charged with 22.8 g (0.1 mol) of 2,2-bis(4-hydroxyphenyl)propane, 0.00244 g ($2\times10^{-5}$ mol) of 4-dimethylaminopyridine and 21.4 g (0.1 mol) of bisphenyl carbonate. After stirring the contents for 2 hours under a nitrogen gas atmosphere, the polycondensation reaction was carried out according to the method similar to that of Example 63 to obtain a colorless and transparent polycarbonate.

The polycarbonate thus obtained had a viscosity-average molecular weight ($\overline{M}v$) of 25,000 and a hue ($A_{380}-A_{580}$) of 0.104.

EXAMPLE 66

A reactor made of stainless steel (SUS 304) was charged with a 0.1N aqueous solution of nitric acid, left as it was for about 20 hours, washed with water and dried.

Using the reactor thus obtained, a reaction similar to that of Example 65 was carried out to obtain a polycarbonate.

The polycarbonate thus obtained had a viscosity-average molecular weight ($\overline{M}v$) of 26,000 and a hue ($A_{380}-A_{580}$) of 0.139.

Example 67

An inner wall of a reactor made of stainless steel (SUS 316) was buffed with a buffing compound having a particle size of 3 μm.

Using the reactor thus obtained, a reaction similar to that of Example 63 was carried out to obtain a colorless and transparent polycarbonate.

The polycarbonate thus obtained had a viscosity-average molecular weight ($\overline{M}v$) of 26,000 as measured and a hue ($A_{380}-A_{580}$) of 0.112.

EXAMPLE 68

An inner wall of a reactor made of stainless steel (SUS 304) was buffed with a buffing compound having a particle size of 3 μm.

Using the reactor thus obtained, a reaction similar to that of Example 63 was carried out to obtain a polycarbonate.

The polycarbonate thus obtained had a viscosity-average molecular weight ($\overline{M}v$) of 27,000 and a hue ($A_{380}-A_{580}$) of 0.106.

EXAMPLE 69

An inner wall of a reactor made of stainless steel (SUS 316) was buffed with a buffing compound having a particle size of 3 μm.

Using the reactor thus obtained, a reaction similar to that of Example 65 was carried out to obtain a colorless and transparent polycarbonate.

The polycarbonate thus obtained had a viscosity-average molecular weight ($\overline{M}v$) of 24,000 and a hue ($A_{380}-A_{580}$) of 0.109.

EXAMPLE 70

An inner wall of a reactor made of stainless steel (SUS 304) was buffed with a buffing compound having a particle size of 3 μm.

Using the reactor thus obtained, a reaction similar to that of Example 65 was carried out to obtain a colorless and transparent polycarbonate.

The polycarbonate thus obtained had a viscosity-average molecular weight ($\overline{M}v$) of 26,000 and a hue ($A_{380}-A_{580}$) of 0.101.

Comparative Example 1

A polycarbonate was prepared in the same manner as that of Example 2 except that a reaction vessel made of stainless steel (SUS 316; comprising 67wt. % of Fe 18wt. % of Cr, 12wt. % of Ni, 2.5wt. % of Mo and 0.06wt. % of C) was used.

The viscosity-average molecular weight ($\overline{M}v$) of the polycarbonate was 18,000, while the hue ($A_{380}-A_{580}$) thereof was 0.319.

Comparative Example 2

A polycarbonate was prepared in the same manner as that of Example 2 except that a reaction vessel made of stainless steel (SUS 304; comprising 74wt. % of Fe 18wt. % of Cr, 8wt. % of Ni and 0 06wt. % of C) was used.

The viscosity-average molecular weight ($\overline{Mv}$) of the polycarbonate was 21,400, while the hue ($A_{380}-A_{580}$) thereof was 0.276.

Comparative Example 3

A polycarbonate was prepared in the same manner as that of Example 2 except that a reaction vessel made of carbon steel (SS-41) was used.

The viscosity-average molecular weight ($\overline{Mv}$) of the polycarbonate was 14,300, while the hue ($A_{380}-A_{580}$) thereof was 0.283.

Comparative Example 4

A polycarbonate was prepared in the same manner as that of Example 6 except that a reaction vessel made of stainless steel (SUS 316) was used.

The viscosity-average molecular weight ($\overline{Mv}$) of the polycarbonate was 18,000, while the hue ($A_{380}-A_{580}$) thereof was 0.319.

Comparative Example 5

A polycarbonate was prepared in the same manner as that of Example 6 except that a reaction vessel made of stainless steel (SUS 304) was used.

The viscosity-average molecular weight ($\overline{Mv}$) of the polycarbonate was 17,000, while the hue ($A_{380}-A_{580}$) thereof was 0.854.

Comparative Example 6

A polycarbonate was prepared in the same manner as that of Example 6 except that a reaction vessel made of carbon steel (SS-41) was used.

The viscosity-average molecular weight ($\overline{Mv}$) of the polycarbonate was 14,800, while the hue ($A_{380}-A_{580}$) thereof was 0.429.

Comparative Example 7

A polycarbonate was prepared in the same manner as that of Example 12 except that a reaction vessel made of stainless steel (SUS 316) was used.

The viscosity-average molecular weight ($\overline{Mv}$) of the polycarbonate was 21,000, while the hue ($A_{380}-A_{580}$) thereof was 0.38.

Comparative Example 8

A polycarbonate was prepared in the same manner as that of Example 12 except that a reaction vessel made of stainless steel (SUS 304) was used.

The viscosity-average molecular weight ($\overline{Mv}$) of the polycarbonate was 20,000, while the hue ($A_{380}-A_{580}$) thereof was 0.40.

Comparative Example 9

A polycarbonate was prepared in the same manner as that of Example 12 except that a reaction vessel made of carbon steel (SS-41) was used.

The viscosity-average molecular weight ($\overline{Mv}$) of the polycarbonate was 17,000, while the hue ($A_{380}-A_{580}$) thereof was 0.50.

Comparative Example 10

A reaction was carried out in the same manner as that of Example 28, except that a reactor made of stainless steel (SUS 316) was used as it was.

The polymer thus obtained had a viscosity-average molecular weight ($\overline{Mv}$) of 21,700, and its hue ($A_{380}-A_{580}$) was 1.17.

Comparative Example 11

A reaction was carried out in the same manner as that of Example 28, except that a reactor made of carbon steel was used as it was.

The polymer thus obtained had a viscosity-average molecular weight ($\overline{Mv}$) of 18,000, and its hue ($A_{380}-A_{580}$) was 2.05.

Comparative Example 12

Using a reactor made of stainless steel (SUS 316) without any treatment on an inner wall thereof, the polycondensation reaction was carried out according to a method similar to that of Example 65 to obtain a polycarbonate.

The polycarbonate thus obtained had a viscosity-average molecular weight ($\overline{Mv}$) of 20,000 and a hue ($A_{380}-A_{580}$) of 0.181.

Comparative Example 13

Using a reactor made of stainless steel (SUS 304) without any treatment on an inner wall thereof, the polycondensation reaction was carried out according to a method similar to that of Example 65 to obtain a polycarbonate.

The polycarbonate thus obtained had a viscosity-average molecular weight ($\overline{Mv}$) of 20,000 and had a hue ($A_{380}-A_{580}$) of 0.202.

Comparative Example 14

Using a reactor made of stainless steel (SUS 316) without any treatment on an inner wall thereof, the polycondensation reaction was carried out according to a method similar to that of Example 65 to obtain a polycarbonate.

The polycarbonate thus obtained had a viscosity-average molecular weight ($\overline{Mv}$) of 18,000 and a hue ($A_{380}-A_{580}$) of 0.319.

Comparative Example 15

Using a reactor made of stainless steel (SUS 304) without any treatment on an inner wall thereof, the polycondensation reaction was carried out according to a method similar to that of Example 65 to obtain a polycarbonate.

The polycarbonate thus obtained had a viscosity-average molecular weight ($\overline{Mv}$) of 21,000 and had a hue ($A_{380}-A_{580}$) of 0.176.

Comparative Example 16

A reaction was carried out in the same manner as that of Example 33, provided that 20 ppm of Ni powder, 20 ppm of Cr powder, 40 ppm of Fe powder and 20 ppm of Ti powder, based on all of the starting materials, were added.

The polycarbonate thus obtained had a viscosity-average molecular weight ($\overline{Mv}$) of 20,000, and its hue ($A_{380}-A_{580}$) was 0.365.

Comparative Example 17

A reaction was carried out in the same manner as that of Example 33, provided that 20 ppm of Ni powder, 20 ppm of Mo powder, 40 ppm of Fe powder and 20 ppm of Ti powder, based on all of the starting materials, were added.

The polycarbonate thus obtained had a viscosity-average molecular weight ($\overline{Mv}$) of 18,000, and its hue ($A_{380}-A_{580}$) was 0.62.

Comparative Example 18

A reaction was carried out in the same manner as that of Example 43, provided that 20 ppm of Ni powder, 20 ppm of Al powder, 45 ppm of Fe powder and 15 ppm of Ti powder, based on all of the starting materials, were added.

The polycarbonate thus obtained had a viscosity-average molecular weight ($\overline{M}v$) of 19,400, and its hue ($A_{380}$-$A_{580}$) was 0.401.

What we claim:

1. A process for producing a polycarbonate by transesterification, said process comprising reacting a dihydroxyl compound with a diester of carbonic acid in a reactor having a surface area made of polyfluoroethylene, said diester of carbonic acid being reacted with said dihydroxyl compound in the presence of a transesterification catalyst comprising at least one member selected from the group consisting of a metal-containing compound, a nitrogen-containing, electron-donating compound, a salt formed from reacting a nitrogen-containing, electron-donating compound with an acid, an electron-donating phosphorus compound and a borane complex, said transesterification catalyst being present in an amount of from $10^{-7}$-$10^{-1}$ mol/mole dihydroxyl compound, said transesterification being conducted at a temperature of from 100°-300° C. and under conditions such that the pressure at completion of the transesterification is not greater than 0.3 Torr.

2. A process for producing a polycarbonate by transesterification, said process comprising reacting a dihydroxyl compound with a diester of carbonic acid in the presence of a nonferrous nickel alloy and contacting the reactants with the nonferrous nickel alloy, said diester of carbonic acid being reacted with said dihydroxyl compound in the presence of a transesterification catalyst comprising at least one member selected from the group consisting of a metal-containing compound, a nitrogen containing, electron-donating compound, a salt formed from reacting a nitrogen-containing, electron-donating compound with an acid, an electron-donating phosphorus compound and a borane complex, said transesterification catalyst being present in an amount of from $10^{-7}$-$10^{-1}$ mol/mole dihydroxyl compound, said transesterification being conducted at a temperature of from 100°-300° C. and under conditions such that the pressure at completion of the transesterification is not greater than 0.3 Torr.

3. A process for producing a polycarbonate by transesterification, said process comprising reacting a dihydroxyl compound with a diester of carbonic acid in the presence of nonferrous nickel alloy and a catalyst of (a) a nitrogen-containing, electron-donating compound or (b) a nitrogen-containing, electron-donating compound and an alkali metal compound, said catalyst being present in an amount of from $10^{-7}$-$10^{-1}$ mol/mole dihydroxyl compound and said transesterification being conducted at a temperature of from 100°-300° C. and under conditions such that the pressure at completion of the transesterification is not greater than 0.3 Torr.

4. The process according to claim 2, wherein an additive having at least a surface thereof made of the nonferrous nickel alloy, is present in the reaction system.

5. The process according to claim 4, wherein the additive is in the form of powder.

6. The process according to claim 2, wherein the alloy contains at least one element selected from the group consisting of Ta, Cr and Cu.

7. The process according to claim 2, wherein the alloy comprises Cu and Zn in an amount of from 60% to 99.5% by weight.

8. The process according to claim 2, wherein the transesterification is carried out in the presence of (a) a nitrogen-containing, electron-donating compound or (b) a nitrogen-containing, electron-donating compound and an alkali metal compound or an alkaline earth metal compound.

9. The process according to claim 6, wherein the transesterification is carried out in the presence of (a) a nitrogen-containing, electron-donating compound or (b) a nitrogen-containing, electron-donating compound and an alkali metal compound or an alkaline earth metal compound.

10. The process according to claim 3, wherein the transesterification is carried out in the presence of (a) a nitrogen-containing, electron-donating compound or (b) a nitrogen-containing, electron-donating compound and an alkali metal compound or an alkaline earth metal compound.

11. The process according to claim 7, wherein the transesterification is carried out in the presence of (a) a nitrogen-containing, electron-donating compound or (b) a nitrogen-containing, electron-donating compound and an alkali metal compound or an alkaline earth metal compound.

12. The process according to claim 2, wherein the dihydroxyl compound is selected from compounds represented by general formula (I)-(VII):

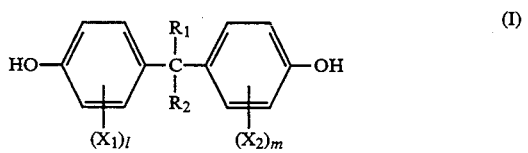

(I)

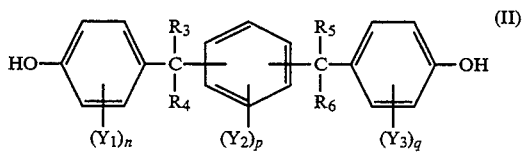

(II)

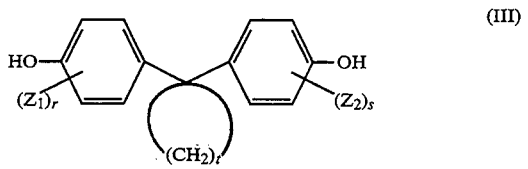

(III)

wherein $R_1$, $R_2$, $R_3$, $R_4$, $R_5$ and $R_6$, are the same or different and each represent a hydrogen atom, an alkyl group, a cycloalkyl group, an aralkyl group; $X_1$, $X_2$, $Y_1$, $Y_2$, $Y_3$, $Z_1$ and $Z_2$, are the same or different, and each represent a halogen atom, an alkoxy group, an alkyl group, a cycloalkyl group, an aralkyl group or an aryl group; l, m, n, p, q, r and s each represent an integer of 0-4; and t represents an integer of 2-10,

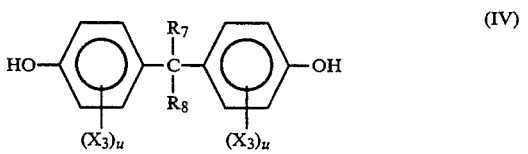

(IV)

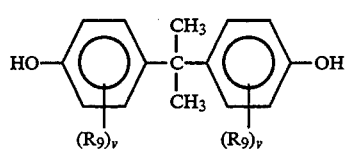
(V)
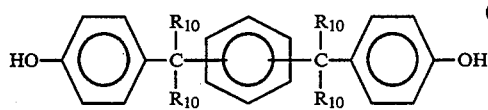
(VI)
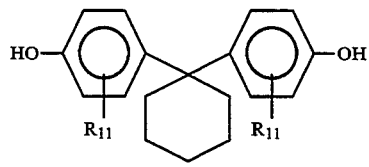
(VII)
wherein $R_7$, $R_8$, $R_9$, $R_{10}$ and $R_{11}$ each represent a hydrogen atom, a straight-chain or branched alkyl group having 1 to 8 carbon atoms or a phenyl group; $X_3$ represents a halogen atom; u is 0 to 4; and v is 1 to 4.
* * * * *

UNITED STATES PATENT AND TRADEMARK OFFICE
CERTIFICATE OF CORRECTION

PATENT NO. : 5 434 227
DATED : July 18, 1995
INVENTOR(S) : Tsutomu YAMATO et al

It is certified that error appears in the above-indentified patent and that said Letters Patent is hereby corrected as shown below:

Column 27, line 16; change "Of carbonic" to
---of carbonic---.
line 35; change "dihydr1829" to
---dihydroxyl---.
line 36; delete "oxyl".
line 39; change "nitrogen containing" to
---nitrogen-containing---.

Column 28, lines 40-42; change "
$$\begin{matrix} R_3 & & R_5 \\ | & & | \\ C & & C \\ | & & | \\ R_4 & & R_6 \end{matrix}$$
" to
---
$$\begin{matrix} R_8 & & R_6 \\ | & & | \\ C & & C \\ | & & | \\ R_4 & & R_8 \end{matrix}$$
---.

Signed and Sealed this

Thirtieth Day of January, 1996

Attest:

BRUCE LEHMAN

Attesting Officer

Commissioner of Patents and Trademarks